United States Patent
Gabber et al.

(10) Patent No.: US 6,763,436 B2
(45) Date of Patent: Jul. 13, 2004

(54) REDUNDANT DATA STORAGE AND DATA RECOVERY SYSTEM

(75) Inventors: Eran Gabber, Summit, NJ (US); Bruce Kenneth Hillyer, Lebanon, NJ (US); Wee Teck Ng, Berkeley Heights, NJ (US); Banu Rahime Ozden, Summit, NJ (US); Elizabeth Shriver, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 187 days.

(21) Appl. No.: 10/059,482

(22) Filed: Jan. 29, 2002

(65) Prior Publication Data

US 2003/0145179 A1 Jul. 31, 2003

(51) Int. Cl.$^7$ .......................... G06F 12/16; G06F 11/16
(52) U.S. Cl. ........................ 711/146; 709/214; 709/216; 711/124; 711/141
(58) Field of Search ...................... 711/146, 124, 711/141, 142, 143, 148; 709/200, 213, 214, 216

(56) References Cited

U.S. PATENT DOCUMENTS 5,335,335 A * 8/1994 Jackson et al. ............. 711/121
5,426,765 A * 6/1995 Stevens et al. ............. 711/131

(List continued on next page.)

FOREIGN PATENT DOCUMENTS

JP      04101251 A   *   4/1992
JP      2000163366 A   *   6/2000

OTHER PUBLICATIONS

Hennessy et al. Computer Organization and Design: The Hardware/Software Interface. $2^{nd}$ ed. Morgan Kaufmann Publishers Inc., 1997, pp. 720–731.*

(List continued on next page.)

Primary Examiner—B. James Peikari
(74) Attorney, Agent, or Firm—Stephen M. Gurey (57) ABSTRACT

A data replication system is disclosed in which replication functionalities between a host computer, an interconnecting computer network, and a plurality of storage devices are separated into host elements and a plurality of storage elements. The host computer is connected to one or more host elements. The host element is responsible for replicating data between the storage devices, which are each connected to an associated storage element, and for maintaining data consistency. Further, the host element instructs a storage element whose associated storage device does not contain up-to-date data to recover from another one of the plurality of storage elements and its associated storage device. The storage elements and their associated storage devices may be located in any combination of diverse or same geographical sites in a manner to ensure sufficient replication in the event of a site or equipment failure. The storage elements are responsible for executing read and write requests received from the host computer and for maintaining data consistency. When a storage element and its associated storage device is determined not to contain up-to-date data, recovery is effected by data transfer from one of the other storage elements and its associated storage device, that is indicated by the host element. Such recovery is done directly between the respective storage elements and associated storage devices, without transiting the data through the host element.

23 Claims, 7 Drawing Sheets

U.S. PATENT DOCUMENTS

| | | | | | |
|---|---|---|---|---|---|
| 5,784,571 | A | * | 7/1998 | Mantopoulos et al. | 709/247 |
| 5,835,741 | A | * | 11/1998 | Elkhoury et al. | 710/310 |
| 5,960,456 | A | * | 9/1999 | Herbst | 711/141 |
| 6,041,380 | A | * | 3/2000 | LaBerge | 710/306 |
| 6,076,139 | A | * | 6/2000 | Welker et al. | 711/104 |
| 6,311,296 | B1 | * | 10/2001 | Congdon | 714/56 |
| 6,470,429 | B1 | * | 10/2002 | Jones et al. | 711/138 |

OTHER PUBLICATIONS http://www.sun.com/storage/software/data_services/sndr/sndr_datasheet.pdf), Oct., 2001.

http://eval.veritas.com/downloads/pro/volume_replicator_whitepaper.pdf), Dec., 2001.

http://www.emc.com/products/product_pdfs/ds/srdf_1523-7.pdf), Jan., 2002.

http://www.hp.com/products1/storage/san/sanlink/index_print.html), Jan. 17, 2002.

http://www.falconstor.comBrochures/IPStorProductBrochure.pdf), 2001.

* cited by examiner

REDUNDANT DATA STORAGE AND DATA RECOVERY SYSTEM

TECHNICAL FIELD

This invention relates to information storage systems.

BACKGROUND OF THE INVENTION

Information is the most crucial asset of many businesses, and any disruption to the access of this information may cause extensive damage. Some businesses, such as banks, airlines (with e-tickets), auction sites, and on-line merchants, may actually stop functioning without access to their information. No matter how reliable a data center is, there can still be site failures—floods, earthquakes, fires, etc. that can destroy the data stored on a storage device and any co-located backup media. Geographic replication is the only way to avoid service disruptions.

Geographic replication has challenges: performance needs to be maintained; different sites might run at different speeds, and have different latencies. Having multiple remote copies may increase reliability, but for most purposes the replicas need to be kept in sync, in real time. If a site fails and comes back on-line, its data need to be recovered without an excessive impact on the rest of the system.

There are three prior art approaches for providing highly reliable data storage by replication. A first approach is host replication, in which the host computer runs software that replicates the data between local and remote server. A host computer thus, before writing on its local storage device, sends the data to another remote host. The SUN Microsystems SNDR (see, e.g., Sun StoreEdge Network Data Replicator Software, available on the SUN website) and Veritas Software's Volume Replicator (see, e.g., Veritas volume replicator: Successful replication and disaster recovery, available on the Veritas website) are examples of this approach. Disadvantageously, specific software must be loaded on each host computer and must be compatible with each host computer's operating system. Further, specific file systems may need to be used for compatibility.

A second approach is storage device replication, in which the storage device replicates the data between a local and remote system. Rather than having a host send the data to another host for replication purposes, the storage device itself communicates with a remote storage device and insures that the data is properly replicated. In this approach, the host treats the remote storage device like it was a direct storage device. Thus, since the host is required to run no special software, it can run any operating system and can use any file system. Disadvantageously, the storage devices themselves that are used in this approach are complex and expensive since they need to perform functions beyond storing data. Further, all the storage devices need be similar since they must communicate with each other. The EMC Corporation's Symmetrix Remote Data Facility (SRDF) product (see, e.g., Symmetrix Remote Data Facility product data sheet, available on the EMC website) uses this second approach. The SRDF provides only two choices for reliability: "safe" access but not fast, in which the host only gets a response after the remote site has acknowledged the write, or "fast" access but not safe, in which the host can receive a positive acknowledgment for an update that eventually gets lost. Furthermore, while the data are safe, a site failure of the primary data site cannot be seamlessly hidden from the host.

A third approach to data replication is appliance replication, in which a storage appliance is connected to the host computer on one side and the multiple storage devices on the other side by means of a storage area network (SAN). The storage devices can be local and/or remote to the appliance or any combination. The appliance performs the replication and unburdens both the host and the storage devices. The appliance approach has the benefit of host and storage platform independence, which eases deployment of features and mixing different storage devices and hosts. Disadvantageously, a bottleneck can be created at the appliance when it needs to recover one copy of the data by moving it through the appliance between storage devices while simultaneously handling the replication of data from the host to the plural storage devices. The former will need to be performed whenever failure recovery takes place or whenever another copy of the data in one storage device is created in a newly connected storage device. Further, the above-noted SAN preferably connects the storage devices rather than a general-purpose network. An example of this third approach is Hewlett-Packard's SANlink product (see, e.g., HP SANlink Overview and Features, available on the HP website). There are several variants to the third approach. Falconstor's IPStor servers, for example, perform appliance replication, but they use an IP network to communicate with the host instead of a SAN. Falconstor requires the host to run a special device driver, which allows the host to communicate with the Falconstor server as if it was a disk via IP network (see, e.g., Falconstor's IP Store Product Brochures available on the Falconstor website).

SUMMARY OF THE INVENTION

The present invention eliminates the problems associated with the prior art approaches. In accordance with the present invention, data replication functionalities between a host computer, an interconnecting network, and a plurality of storage devices are separated into host elements and a plurality of storage elements. One or more host elements are associated with the host computer and a storage element is associated with and connected to each of the plurality of storage devices. The network can be any computer network such as the Internet or an intranet. The host element is connected to the host computer and behaves, from the standpoint of the host computer, like a direct-attached disk. The host element is responsible for replicating data between the storage devices, and for maintaining data consistency. Further, the host element functions to instruct a storage element that does not contain up-to-date data in its associated storage device to recover that data from an indicated other one of the plurality of storage elements and its associated storage device. The storage elements and their associated storage devices may be located in any combination of diverse or same geographic sites in a manner to ensure sufficient replication in the event of a site or equipment failure. The storage elements are responsible for executing requests received from the host element and for maintaining data consistency. When a storage element and its associated storage device is determined not to contain up-to-date data, recovery is effected by data transfer from one of the other storage elements and its associated storage device, the identity of that other storage element being indicated by and received from the host element. Such recovery is done directly between the indicated other storage element and its associated storage device and the non up-to-date storage element and its associated storage device. Advantageously, by separating the work functions between the geographically separated host elements and storage elements, recovery between storage elements can be effected directly between these storage elements and their associated storage devices without moving data through the host element. Thus, data intensive manipulations of the data stored in the storage devices can be performed without host element involvement. Typical operations such as maintaining snapshots can be performed efficiently since multiple data exchanges need only take place between the storage device and the storage element and not over the network as in some prior art approaches. A further advantage of the present invention is that, since the host element is accessed like a local disk, the host computer does not require any hardware or software modifications. Thus, there are no dependencies upon any particular operating system or application running on the host.

In determining that a storage element and its associated storage device does not contain up-to-date data, the host element assigns consecutive sequence numbers to consecutive write requests from the host computer, which sequence number is sent along with the request from the host element to the storage elements. The storage element and its associated storage device is determined not to have up-to-date data when it fails to receive one or more recent write requests, or when a gap is detected in the sequence number of received write requests.

DETAILED DESCRIPTION

Figure 1:
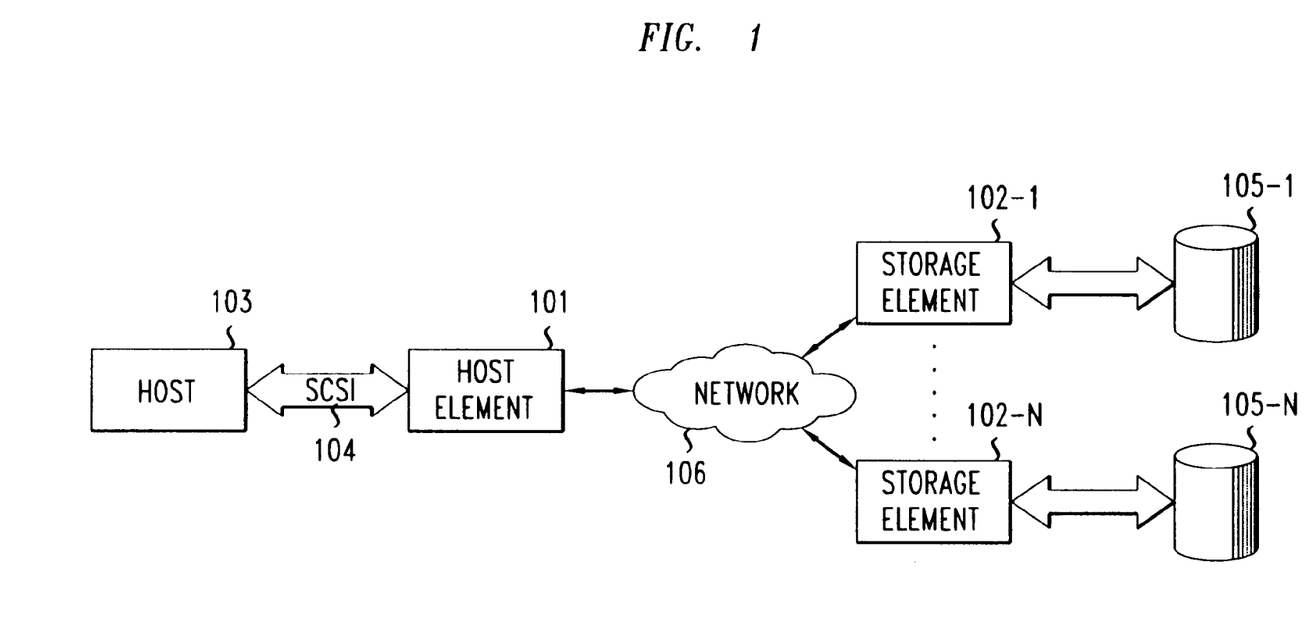
FIG. 1 is a block diagram showing an illustrative embodiment of a system that incorporates the architecture of the present invention.

FIG. 1 shows an illustrative embodiment of a system that incorporates the architecture of the present invention. It includes a host element (HE) 101 and one or more storage elements (SE) 102-1–102-N. The SEs 102 and HE 101 are separated geographically and interconnected over a network, such as IP network 106. The host element 101 is responsible for interfacing with a host computer 103 over, for example, a SCSI connection 104. SCSI (Small Computer Storage Interface) is a well-known ANSI standard protocol (see "Information Technology—The SCSI-2 Common Access Method Transport and SCSI Interface Module", ANSI X3.232-1996, 1996) for physically connecting computers to storage devices. The host element 101 may use other interfaces with the host computer 103, such a Fibre Channel (see, e.g., "Fibre Channel: Gigabit Communications and I/O for Computer Networks", McGraw Hill, 1996). To the host computer 103, host element 101 behaves like a direct-attached disk. The host element 101 is responsible for replicating the data between the storage devices 105-1–105-N connected to storage elements 102-1–102-N, respectively, and maintaining data consistency. In addition to being responsible for replicating data, host element 101 is responsible for instructing any storage element 102 that lost any data to recover from another indicated one of the storage elements 102. Host element 101 encapsulates incoming SCSI requests (e.g., reads and writes) in messages and sends those messages to the storage elements 102 for execution. Alternatively, the host element 101 may convert the SCSI requests to another format, which is easier for processing by the storage elements 102, before it sends them to the storage elements. Host element 101 also maps logical volumes to a particular SCSI target ID and logical unit number (LUN). The system provides one or more logical volumes to the host computer 103. Each logical volume looks to the host as a separate storage device. Plural logical volumes, however, may be stored together on the same storage device, which is connected to one of the storage elements 102. Each of the storage devices 105 can be connected to its respective one of the storage elements 102 using, for example, a SCSI interface, Fiber Channel interface, or an ATA interface (Advanced Technology Attachment) (see "Information Systems—AT Attachment Interface for Disk Drives", ANSI X3.221-1994, 1994).

Each of the storage elements 102 is responsible for executing the requests received from host element 101 and maintaining state related to data consistency. A particular one of the storage elements 102 performs recovery by direct data transfer from another one of the storage elements 102 as indicated by the host element 101 without data transiting the host element. Communication between host element 101 and the storage elements 102 is via TCP/IP sockets over IP network 106.

This illustrative system in FIG. 1 can provide multiple levels of data replication, both between multiple storage elements and inside the connected storage devices. With respect to the latter, the storage device can be a RAID (Redundant Array of Independent Disks, a/k/a Redundant Array of Inexpensive Disks) unit (see, e.g., P. M. Chen, E. K Lee, G. A. Gibson, R. H. Katz, and D. A. Patterson, "RAID: High-Performance, Reliable Secondary Storage" ACM Computing Surveys, Volume 26, Number 2, Jun. 1994, pp. 145–185) wherein the data is replicated within the device. Replication between storage elements protects against site failures while replication within storage elements protects against disk failures.

The system advantageously masks multiple types of failures without any visible indication to the host computer, operating transparently under any single failure of a host element or a storage element. Whereas the host element 101 is a critical element in the system shown in FIG. 1, since it handles all interactions with the host computer 103, a redundant host element, as will be later described, can be employed to eliminate the host element as a single point of failure. As noted, the data are replicated over several storage elements 102 in their associated storage devices 105. While a single active copy of the data is sufficient to enable uninterrupted access, an automatic mechanism can disable access if the number of active replicas drops below any user-specified threshold. Accordingly, a recovery protocol for the storage element, to be described hereinafter, will reestablish consistency when a new or repaired storage element 102 reconnects to the host element 101.

In order to maintain consistency of data in all of the storage elements 102, writes need to be sent to each of the storage element's storage devices 105 in the same order that they were received from the host computer. Even if consecutive writes are in non-overlapping sections of the logical volume, host computers often depend on the writes occurring in the proper order. For reads, however, more flexible scheduling constraints can be used while still maintaining consistency. Reads can always be executed before or after adjacent reads. Reads can also be executed before of after adjacent writes if the read and the write are on non-overlapping sections of the logical volume.

This consistency is ensured by employing update sequence numbers, which are consecutive integers. The highest received update sequence number is stored by the storage element for each logical volume. The host element 101 maintains a current update sequence number for each logical volume. When the host element 101 is started, this update sequence number is initialized as the highest sequence number from any of the connected storage elements, the host element 101 only becoming active when a user-specified number of storage elements 102 are connected. Whenever a new write arrives from the host computer 103, the host element 101 increments the update sequence number. For reads, the sequence number of the most recent write is used as a reference sequence number for that read, as only the surrounding writes provide constraints on when the read can be executed. Furthermore, reads also have their own set of sequence numbers, although these sequence numbers do not need to be persistent across restarts of the entire system. These read sequence numbers are only used for matching up replies with the original request, and are not used for ordering. These read sequence numbers will not be discussed further.

Each of the storage elements 102 performs write operations on its local storage 105 in the order of their update sequence numbers. Since all storage elements 102 commit write operations in the same order, the storage elements 102 maintain a consistent but possibly dated version of the data. To ensure that the writes are performed on the disk in the correct order and without gaps, the storage elements 102 maintain counters in non-volatile memory.

Figure 2:
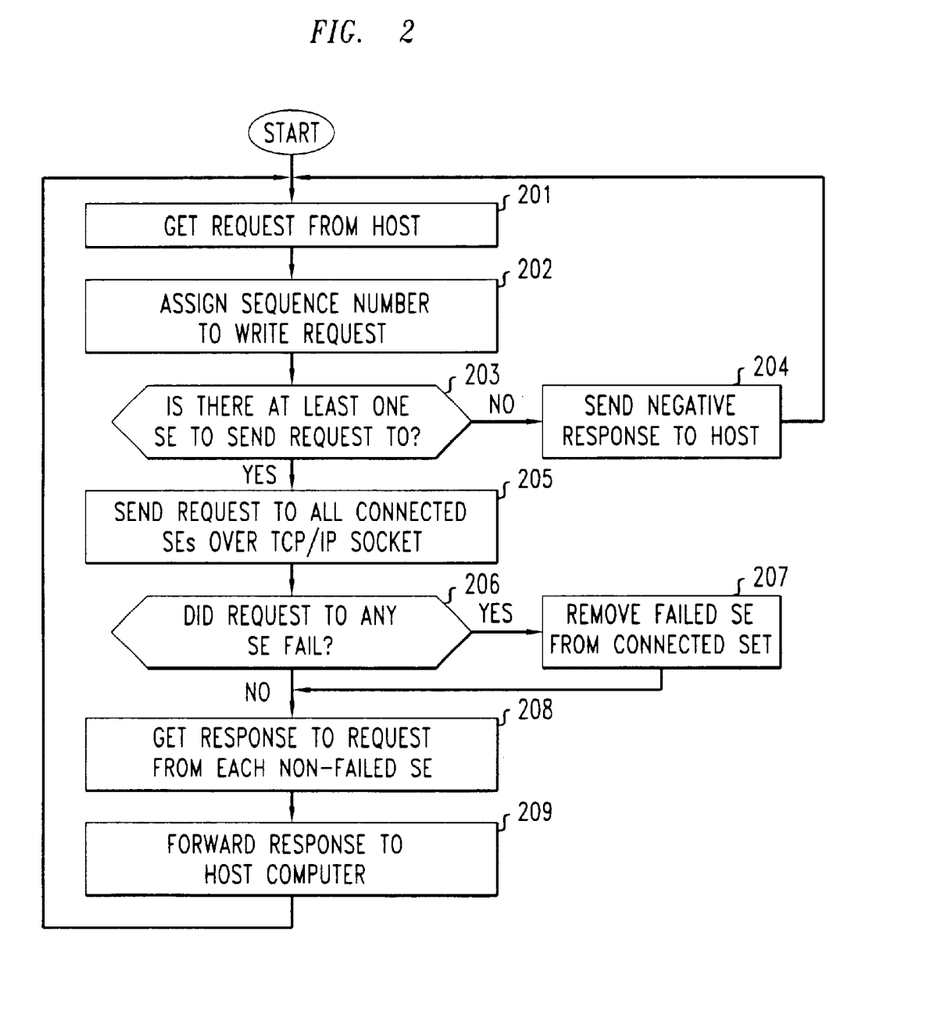
FIG. 2 is a flowchart that details the steps that a host element performs in processing a request originating from a host computer.

The steps the host element 101 performs in processing a request originating from a host computer will be described with reference to the flowchart in FIG. 2. At step 201, the host element receives a request (e.g., a read or a write) from the host computer 103. At step 202, a sequence number is assigned to the request if it is a write request. At step 203, a determination is made whether there is at least one storage element 102 to which to send the request. If not, at step 204, a negative response is sent back to the host computer 103. If yes, at step 205, the request is sent to all connected storage elements 102 over a TCP/IP socket. The set of connected storage elements are those with which the host element 101 communicates. At step 206, a determination is made whether the request sent to any storage element 102 in the connected set failed (i.e., due to a network failure or failure of a storage element). If such a failure occurs, observed by the host element 101 by the failure to receive a response back from a particular storage element, then, at step 207, the failed storage element is removed from the connected set. If, at step 206, the request sent to any storage element 102 did not fail, then, at step 208, a response is received. The response to a read request is the requested data, while a response to a write request is an indication that the data has been received. At step 209, the responses are forwarded to the host computer 103, while the host element 101 awaits receipt of a next request.

Figure 3:
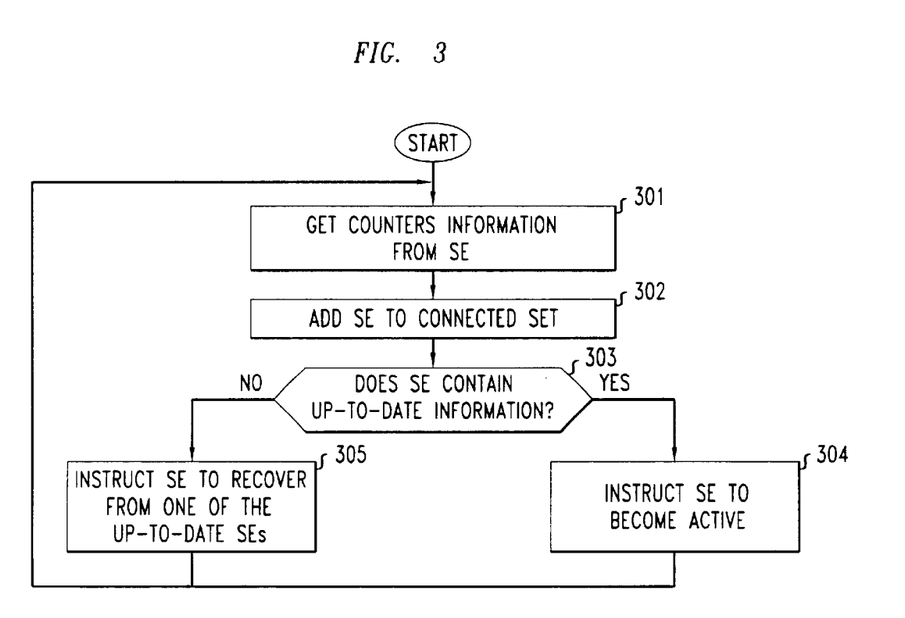
FIG. 3 is a flowchart that details the steps that a host element performs in managing a connection with a storage element.

The steps the host element 101 performs in managing a connection with a particular storage element 102 will be described with reference to the flowchart in FIG. 3. At step 301 the host element 101 receives counters information from a particular storage element 102. At step 302, that particular storage element is added to the connected set. At step 303, a determination is made whether that particular storage element 102 contains up-to-date data. If it does, at step 304, a message is sent to that storage element to change its state to ACTIVE, to be described hereinafter. If that particular storage element 102 is determined at step 303 not to contain up-to-date data, then, at step 305, that storage element is instructed to recover from one of the other storage elements 102, which is up-to-date.

Figure 4:
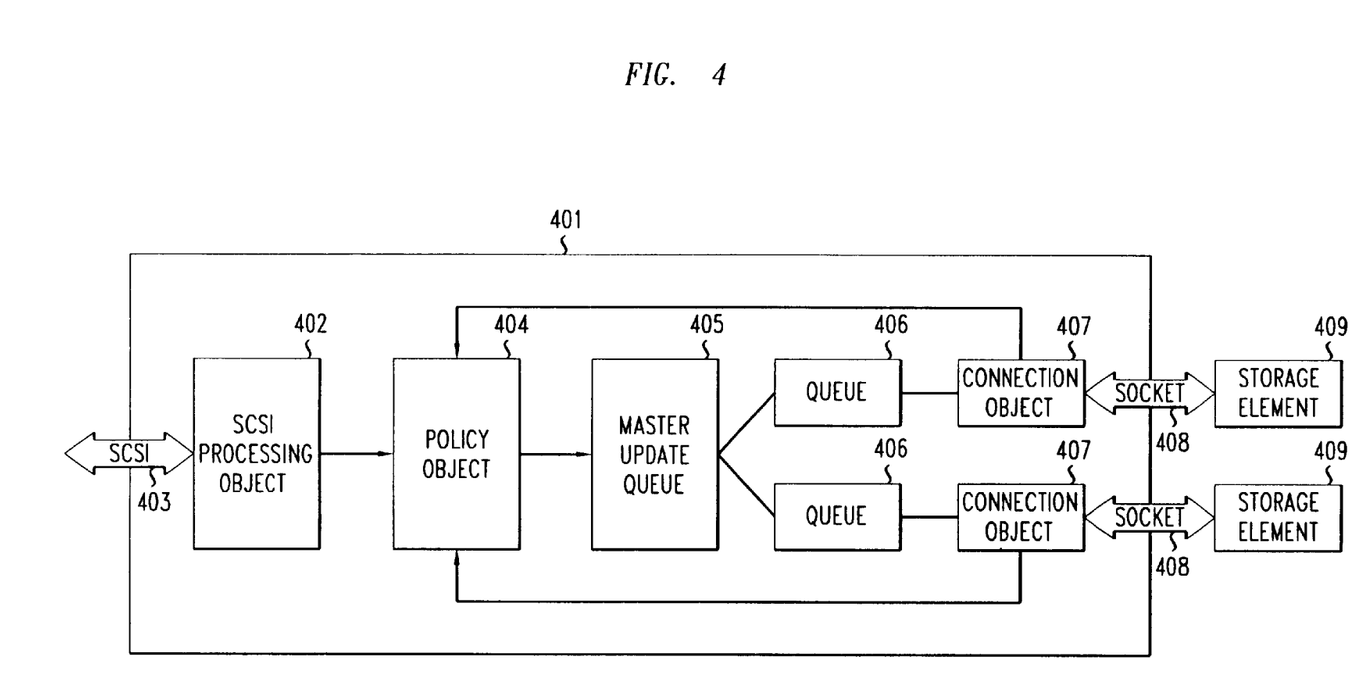
FIG. 4 is a block diagram showing an embodiment of a host element as implemented in software as a collection of objects.

FIG. 4 shows an exemplary structure of an embodiment of a host element 401, as implemented in software as a set of objects. Assuming a SCSI interface with the host computer, the SCSI processing object 402 reads SCSI requests from the SCSI bus 403, and passes them to the policy object 404. These requests include read and write requests. As will be described, the policy object 404 is responsible for deciding which set of storage elements should handle this request. It then places a copy of the message on a master update queue 405. The master update queue 405 maintains a set of recent writes in the host element 401 so that the messages do not have to be duplicated for every connected storage element 409. A pointer to the message on the master update queue 405 is then placed on each queue 406, which is associated with a storage element that is supposed to receive it. A connection object 407 is connected to each queue 406 and is responsible for managing the socket 408 to its associated storage element 409. Specifically, each connection object 407 takes messages off of its queue 406, and sends them over its socket 408. It also reads responses from the socket, and processes the responses that are received from its associated storage element 409. If a connection object 407 receives a SCSI acknowledgment from its associated storage element 409, it passes that response back to the policy object 404. The policy object 404 is responsible for matching the acknowledgments with outstanding requests, and for eventually telling SCSI Processing object 402 to send a SCSI acknowledgment back to the host computer.

As noted above, the host element employs "policies" to determine how to route read/write requests, and when to send acknowledgments to the host computer. There are two decisions to be made: to which storage elements a read request should be sent, and how many responses should be received before sending an acknowledgment to the host computer. As an example, a "SendAll; WaitOne" policy sends read requests to all storage elements, and sends a reply to the host computer as soon as the first response is received from some storage element. This policy has the lowest latency, but at the cost of sending the most messages. An alternative read policy is "SendOne; WaitOne", which sends the read request to a single storage element and waits for a response from this storage element. Depending on the storage element selection algorithm, the latency of the latter policy could approach the latency of the "SendAll; WaitOne" policy, but with fewer messages being sent.

Write requests must be sent to all storage elements. The write policy only determines when the operation is acknowledged to the host computer. The following policies are noted as follows from the slowest, most reliable policy, to the fastest, least reliable policy: (1) with a "WriteAll; WaitAll" policy, the host element acknowledges the operation after all storage elements confirm that the write was successfully committed to disk; (2) with a "WriteAll; WaitQuorum" policy, the host element acknowledges the operation after a quorum of storage elements confirm that the write was successfully committed to disk; (3) with a "WriteAll; Wait-Redundant" policy, the host element acknowledges the operation after the request has been received by a redundant host element, the latter to be described below; and (4) with a "WriteAll; NoWait" policy, the host element acknowledges the operation as soon as the write request is received by the host element, even before it is sent to any storage elements. The latter policy relies on the "deferred error" capability of the SCSI protocol to notify the host computer of writes that failed after they were previously acknowledged.

Figure 5:
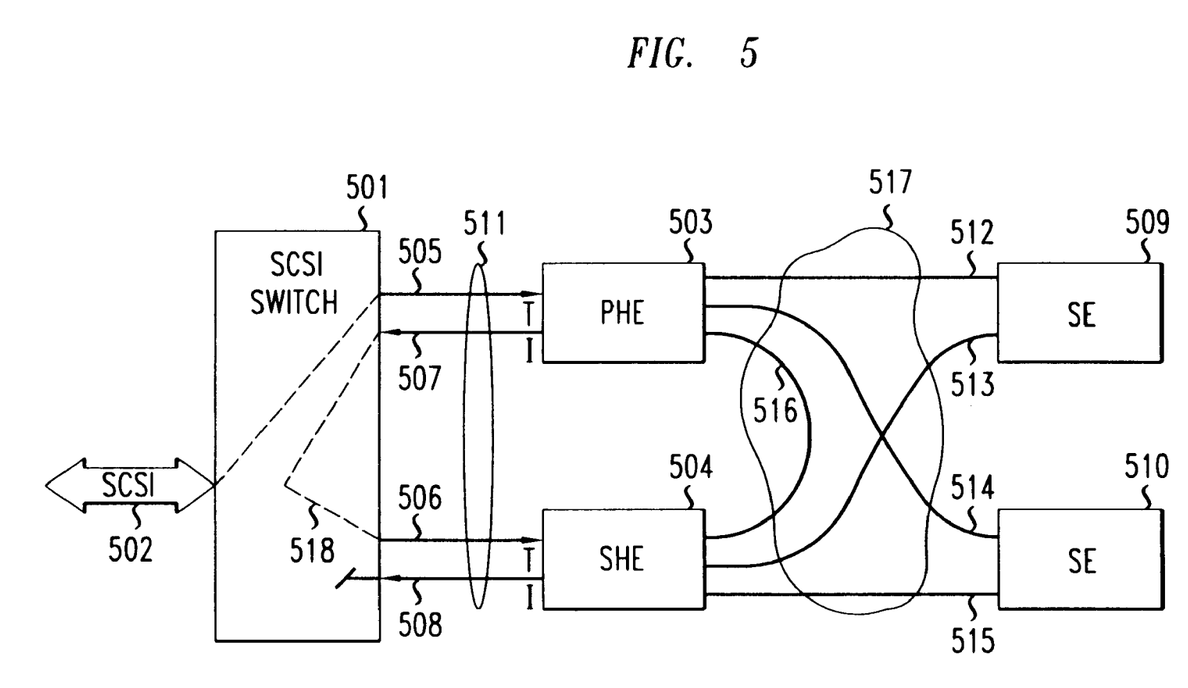
FIG. 5 shows an implementation of the system of FIG. 1 employing a secondary host element that eliminates the host element as a single point of failure.

As previously noted, in order to eliminate the host element as a single point of failure, the architecture shown in FIG. 1 can alternatively be configured with a hot standby host element, which is called a secondary host element (SHE). The secondary host element is responsible for backing up the important state of the primary host element (PHE), and for taking over if the primary host element should fail. FIG. 5 shows the architecture of redundant host element system. In this embodiment, a SCSI switch 501, a programmable hardware device containing a crossbar switch, interconnects the incoming SCSI channel 502 from the host computer to outgoing SCSI channels 511 that interface with the primary host element 503 and secondary host element 504. SCSI switch 501 can move SCSI traffic seamlessly from one host element to another. Such a SCSI switch is an off-the-shelf device, like the BlackBox SW-487A SCSI switch. A host element 503 or 504 can change the switch configuration by sending commands to the Ethernet connection of the switch 501. The primary host element 503 and the secondary host element 504 each have two SCSI buses, one on each in the target (T) mode for receiving requests (505 and 506, respectively), and one on each for initiating (I) requests (507 and 508, respectively). Both buses are switched by SCSI switch 501. Both storage elements 509 and 510 have connections (512, 513, 514, 515) open to host elements 503 and 504 through network 517. The secondary host element 504 also has a socket 516 through network 517 open to the primary host element 503.

The transfer path 518 of a write request is shown in FIG. 5. The request is sent by the host computer through the SCSI switch 501 to the target bus 505 of the primary host element 503. The primary host element 503 then assigns a sequence number to the write, and forwards the request with its sequence number via bus 507 to the secondary host element 504. The request is tagged so that secondary host element 504 can determine that it originated from primary host element 503 and not from the host computer. Once the secondary host element 504 receives the write request on its target bus 506 and sends an acknowledgement on bus 506, primary host element 503 receives the acknowledgement on bus 507. Now the primary host element 503 can send an acknowledgement to the host on bus 505 under the "Write All; Wait Redundant" policy, as the write has now been duplicated in the secondary host element.

The primary host element 503 sends periodic heartbeat messages to the secondary host element 504 on the SCSI bus 507. The heartbeats are only sent if the primary host element can communicate with at least one of the storage elements 509 and 510. If the primary host element 503 fails, the secondary host element 504 detects the lack of heartbeats on bus 506, and prepares to take control. It actually takes control only if it can communicate with at least one of the storage elements 509 and 510. If it can, it takes control by reprogramming the SCSI switch 501 to route traffic from the host computer to target bus 506 of secondary host element 504, and connecting initiator bus 508 of secondary host element 504 to target bus 505 of primary host element 503. The roles of the primary host element 503 and secondary host element 504 are now completely reversed.

Two actions (sending heartbeats and taking control) require that the host element be able to communicate with at least one storage element. This prevents a host element with no network connectivity from taking control. If a host element is primary, but cannot talk to any storage element, it stops sending heartbeats so that the secondary host element can take over control.

If two host elements start simultaneously, the SCSI switch 501 serves as an arbitrator. Upon startup, a host element determines if it is primary or secondary based on the SCSI switch configuration. Furthermore, whenever a host element receives a write request from the other host element, the receiving host element immediately assumes a secondary mode. This protocol prevents an extended period of time where both host elements think they are primary. Even if both host elements are in the primary mode, no harm is done, as SCSI messages from the host computer can only reach one host element, and this host element will process the message as primary.

The host element has multiple throttling mechanisms to prevent the host computer from getting too far ahead of any of the storage devices. A first mechanism is based on queue size: each storage element reports to the host element if its pending write queue is growing. The size of a storage element's pending write queue is the number of outstanding writes that have not yet been written to the storage device. If any storage element is falling too far behind, the host element delays briefly, applying back pressure on the flow of messages from the host computer, which means that it momentarily stops processing SCSI request from the SCSI bus. If the storage element falls further behind, the host element delays longer to let the storage element catch up. If one storage element is slightly slower than the others, then the host element delays periodically, so that the slowest storage element can keep up. A second throttling mechanism is based on the internal queues of the host element. If there are too many messages waiting to be sent to a storage element, the host element delays briefly to allow the queue to shrink. A third throttling mechanism is meant to prevent flooding of a storage element. If messages are sent to a storage element too rapidly, it is possible that the storage element can be overwhelmed before it can reply with a message showing its growing queue size. Therefore, the host element monitors the gap between the last message it sent to the storage element, and the last acknowledgment it received from that storage element. If the gap is too large, the host element delays briefly to allow the storage element to catch up. For all throttling mechanisms, there is a maximum delay time. The host element will only slow down to a certain level. If the maximum slow down is not sufficient, the slowest storage element is eventually dropped.

Figure 6:
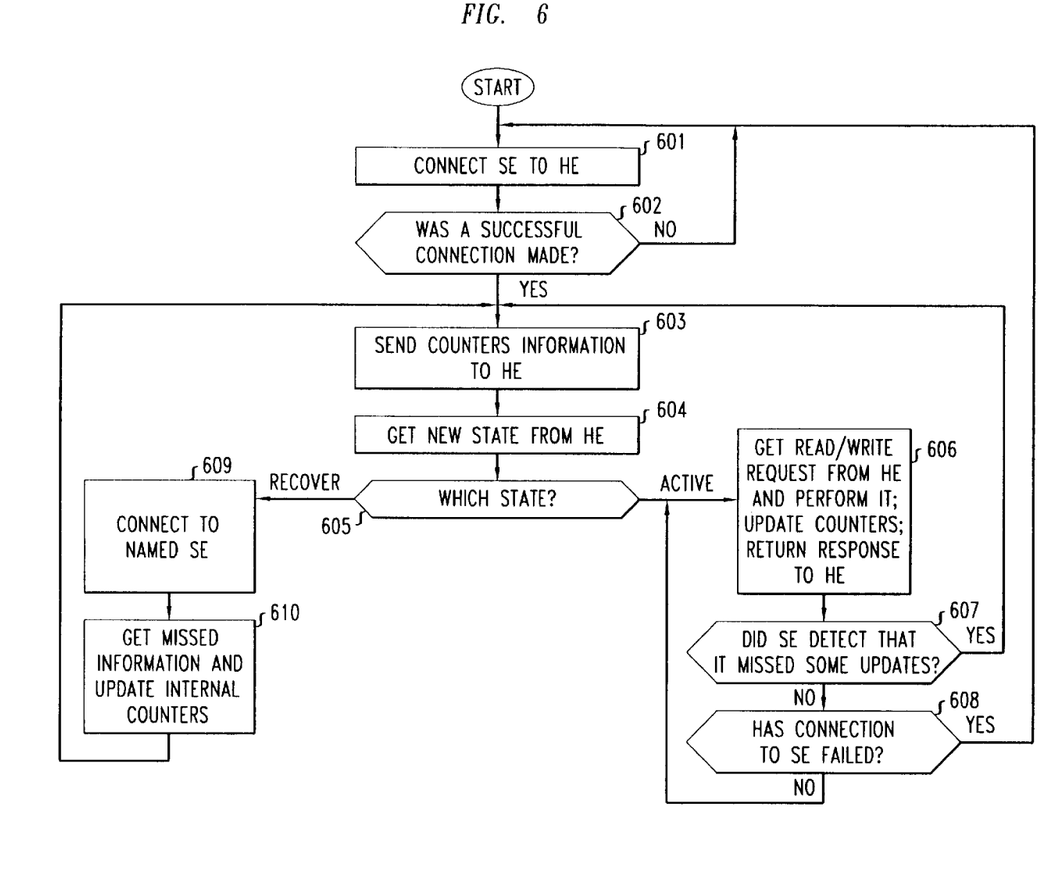
FIG. 6 is a flowchart that details the steps a storage element performs in processing a request received from a host element.

The steps a storage element 102, in FIG. 1, performs in processing a request will be described with reference to the flowchart in FIG. 6. This flowchart is the counterpart to the flowcharts in FIGS. 2 and 3. As previously described, the system provides one or more logical volumes to the host computer 103. The steps illustrated in FIG. 6 are performed for all logical volumes in the storage element. The state of each logical volume can be either INIT, ANNOUNCE, RECOVER, or ACTIVE. At step 601, a new storage element 102 is connected to the host element 101 when it connects to the network. At this point, when the connection to the host element is not established, the state of the logical volume is INIT (initial). If the connection is dropped while the logical volume is any other state, the state is changed back to INIT.

At step 602, a determination is made whether a successful connection has been made. If not, another attempt is made to establish the connection, the latter being repeated until a successful connection is established. Once a successful connection is established, at step 603, the state is changed to ANNOUNCE, and counters information is sent to the host element to enable the host element determine whether the storage device has up-to-date data. When in the ANNOUNCE state, the logical volume only accepts write requests and returns read requests with an error code. At step 604, the storage element receives information from the host element to change its state from ANNOUNCE to RECOVER or to ACTIVE. If the storage element does not have up-to-date data, then the host element directs it to change its state to RECOVER and indicates the identity of the storage element from which recovery should be made. If the storage element does have up-to-date data, then the host element directs it to change its state to ACTIVE. If, at step 605, the new state is ACTIVE, then when, at step 606, it gets a read/write request from the host element, it performs the request, updates its counters, and returns a response to the host element. If, at step 607, the storage element later detects that it missed any updates, the storage element, returning to step 603, changes its state to ANNOUNCE and sends counters information to the host element. If, at step 608, the connection to the host element fails, then, returning to step 601, the storage element changes its state to INIT, and reconnects to the host element. If updates are not missed and the connection to the host element does not fail, then the storage element continues, at step 606, to receive and respond to read/write requests received from the host element. If, at step 605, the new state received from the host element at step 604 is determined to be RECOVER, then, at step 609, the state is changed to RECOVER, and the storage element is connected to the indicated other storage element from which recovery will take place. In the RECOVER state, the storage element is recovering the contents of the logical volume and the logical volume accepts only write requests, returning read requests with an error code. At step 610, the storage element gets its missed data directly from the indicated other storage element and updates its internal counters, where recovery does not transit the host element. Then, returning to step 603, it changes its state to ANNOUNCE, and sends its new counters information to the host element.

Figure 7:
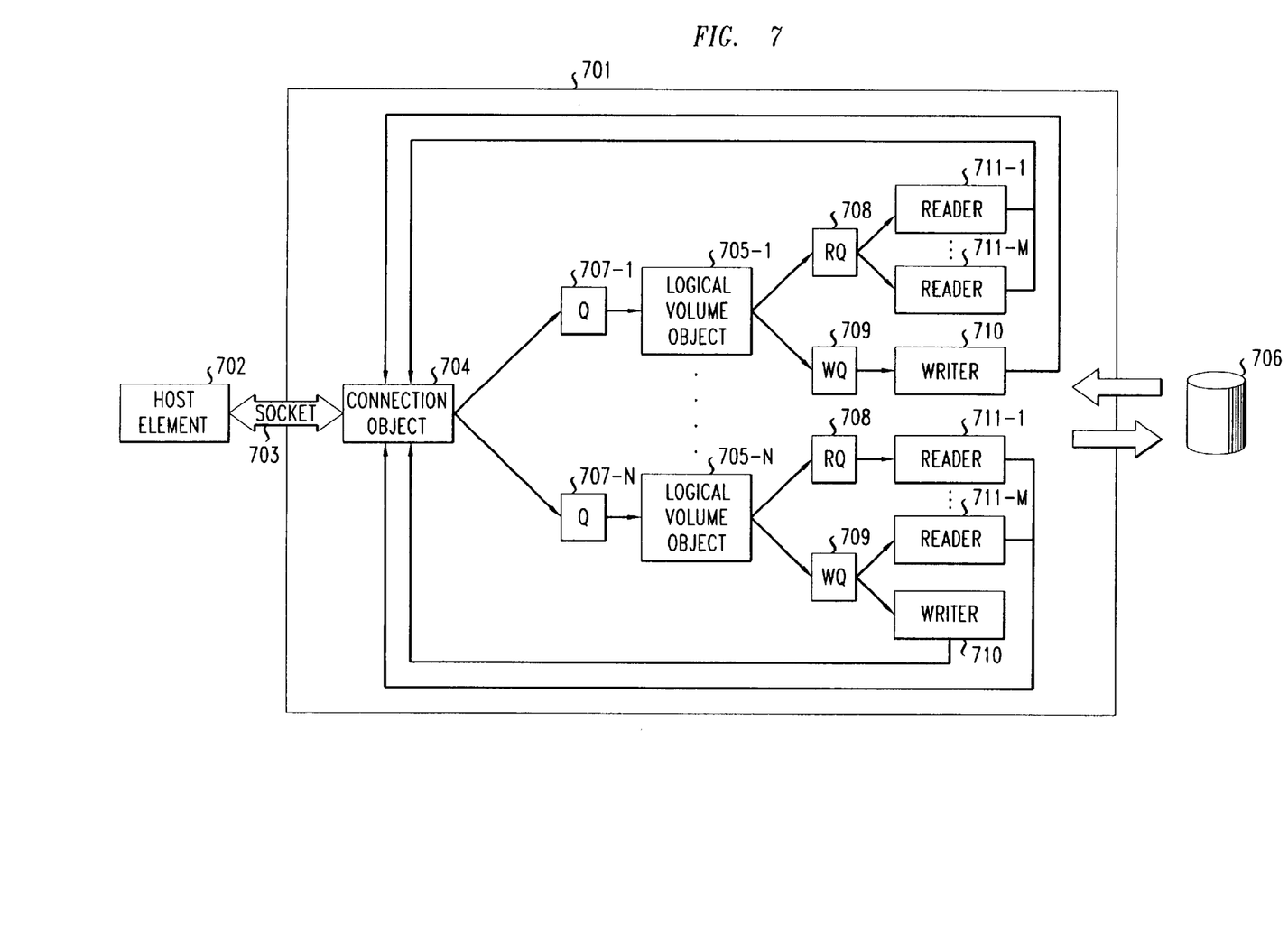
FIG. 7 is a block diagram showing an embodiment of a storage element as implemented in software.

FIG. 7 is an exemplary block diagram of a software embodiment of a storage element 701 consisting of objects connected by queues. In this embodiment, the storage element 701 is connected to host element 702 over an IP network (not shown) via socket 703. Connection object 704 controls the communication with host element 702 and plural logical volume objects 705-1–705-N. Each logical volume object controls the operations on the data in a corresponding logical volume on a connected storage device 706, by maintaining the state of that corresponding logical volume. The connection object 704 reads requests from the host element 702 and places them in the appropriate queue ("Q") 707-1–707-N that is associated with and connected to the input of the logical volume object 705-1–705-N to which the request is directed.

As previously noted, each logical volume on storage device 706 may be in the INIT, ANNOUNCE, RECOVER and ACTIVE states, which are maintained by the associated logical volume object 705. Based on the state of its associated logical volume, each logical volume object 705 accepts or ignores requests and sends incoming requests to either a read queue (RQ) 708 or a write queue (WQ) 709 in the correct order. There is a single write object 710 associated with each logical volume, which performs the write requests sequentially in its associated write queue 709, and updates it corresponding counters (not shown). Multiple reader objects 711-1–711-M may be associated with a logical volume to allow concurrent reads from the logical volume on storage device 706.

The storage element 701 reports the sizes of its queues to the host element to prevent overflows. As previously described, the host element uses this information to perform throttling.

Recovery is performed by a storage element in two cases. In the first, the storage element has connected to the host element, sending its counters information to the host element. The host element then detects that the storage element has missed some updates. In the second case, the storage device detects a gap in the sequence of updates it has received from the host element. In this latter case, the storage element informs the host element that it needs to recover. The next step in both cases is that the host element informs the recovering storage element from which other up-to-date storage element it should recover its data. At the end of the recovery, the recovered storage element sends its counters information to the host element. The host element should find that the recovered storage is now up-to-date. If it isn't, the host element instructs the just recovered storage element to recover again from a different active storage element.

In some configurations, one storage element may be co-located with the host element in the same geographical location in order to reduce the response time of the host element, since the communication between the host element and the co-located storage element is much faster than the communication with a far away storage element. In this case, the host element should employ read and write policies that require a response only from a single storage element, such as "SendOne; WaitOne".

Advantageously, in the above-described system, the separation of the work functions between the geographically separated host elements and the storage elements enables recovery to be effected directly between storage elements without moving data through the host element. Thus, data intensive manipulations of the data stored in the storage devices can be performed without host element involvement. Thus, typical operations such as maintaining snapshots can be performed efficiently since multiple data exchanges need only take place between the storage device and the storage element and not over the network. Snapshots are frozen images of the data in a storage device as they appeared at some time in the past. A further advantage of the system is that, since the host element is accessed like a local disk, the host computer does not require any hardware or software modifications in order to operate. Thus, there are no dependencies upon any particular operating system or application running on the host.

Additional advantages of the above-described system are that one can implement data access and management services in the host element, the storage elements, or divide them between the two to best match the requirements of the particular services. For example, the host element may perform data encryption and decryption in order to prevent access to the data as it is sent over the communication network and stored on the storage elements and their associated storage devices. Data intensive manipulations, such as snapshots, are best implemented by the storage elements, as described above. Some services, such as caching, may be split between the host element and the storage elements.

It should also be recognized by those skilled in the art that the functions of the host element could be incorporated into the host computer as a single unit. Similarly, the functions of the storage element could be incorporated into the associated storage device as a single unit.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A host element for use in a redundant data system which comprises a host computer, at least one said host element associated with and connected to said host computer, a plurality of storage devices, and an interconnecting computer network, the host element comprising:

interface means for receiving read and write requests from the host computer;

means for assigning consecutive sequence numbers to consecutively received write requests;

means for sending a received request to at least a subset of the storage devices over the computer network, the sequence number assigned to each write request being sent to the at least a subset of storage devices with each request;

means for receiving an indication that a storage device does not have up-to-date data; and means for sending that storage device the identity of another of the plurality of storage devices from which data recovery should be made, wherein data recovery from the other storage device is directly made without transiting through the host element.

2. The invention of claim 1 wherein the computer network is an IP network.

3. The invention of claim 1 wherein the host element emulates a direct-attached storage device, whereby the host computer can send requests to and receive responses from the host element using the same hardware and software it uses to communicate with direct-attached storage devices without any modifications to that hardware or software.

4. The invention of claim 1 wherein the indication that a storage device does not have up-to-date data is generated when the storage device fails to receive one or more recent write requests.

5. The invention of claim 1 wherein the indication that a storage device does not have up-to-date data is generated when a gap is detected in the sequence numbers of write requests consecutively received by the storage device.

6. A storage element for use in a redundant data system which comprises a host computer, a plurality of storage devices, and an interconnecting computer network, at least one storage element being associated with and connected to each one of the storage devices, each one storage element comprising:

means for executing read and write requests on the associated storage device, such requests being received from the host computer over the computer network, each received write request having an associated sequence number that is consecutively assigned by the host computer and sent with the write request; and means for recovering data from an indicated other storage element and its associated storage device when the one storage device and its associated storage element is determined not to contain up-to-date data, the indication of the other storage element being received from the host computer, wherein data recovery from the other storage element and its associated storage device is directly made without transiting through the host computer.

7. The invention of claim 6 wherein the computer network is an IP network.

8. The invention of claim 6 wherein the one storage device and its associated storage element are determined not to contain up-to-date data when the storage device and its associated storage device fail to receive one or more recent write requests.

9. The invention of claim 6 wherein the one storage device and its associated storage element are determined not to contain up-to-date data when a gap is detected in the sequence numbers of write requests consecutively received by the storage element.

10. A redundant data system comprising:

a host element adapted to be connected between a host computer and a computer network; and a plurality of storage elements each adapted to be connected between the computer network and an to associated storage device;

the host element sending read and write requests received from the host computer to at least a subset of the plurality of storage elements and their associated storage devices, and sending a storage element from which an indication is received that its associated storage device does not contain up-to-date data the identity of another storage element from which recovery should directly be made, the host element assigning consecutive sequence numbers to consecutive write requests that are sent with each write request to the at least a subset of the plurality of storage devices;

each of the storage elements receiving a read or write request from the host element executing that request on its associated storage device, and when a storage element's associated storage device is determined not to have up-to-date data, recovering data from the other storage device that is associated with the storage element indicated by and received from the host element, wherein said data recovery is directly made without transiting through the host element.

11. The invention of claim 10 wherein the computer network is an IP network.

12. The invention of claim 10 wherein the host element emulates a direct-attached storage device, whereby the host computer can send requests to and receive responses from the host element using the same hardware and software it uses to communicate with direct-attached storage devices without any modifications to that hardware or software.

13. The invention of claim 10 wherein data access and management services are divided between the host element and the storage elements.

14. The invention of claim 10 wherein the host element receives an indication that a storage element and its associated storage device does not contain up-to-date data when the storage element and its associated storage fail to receive one or more recent write requests.

15. The invention of claim 10 wherein the host element receives an indication that a storage element and its associated storage device does not contain up-to-date data when a gap is detected in the sequence of write requests consecutively received by the storage element.

16. A method for use in a system which comprises a host computer, a plurality of storage devices, and an interconnecting computer network, the method comprising:

receiving read and write requests from the host computer;

assigning consecutive sequence numbers to consecutively received write requests;

sending a received request to at least a subset of the storage devices over the computer network together with the sequence number assigned to that received request;

receiving an indication that a storage device does not have up-to-date data; and sending that storage device the identity of another of the plurality of storage devices from which data recovery should be made, wherein data recovery from the other storage device is directly made without transiting through the host computer.

17. The invention of claim 16 wherein the computer network is an IP network.

18. The invention of claim 16 wherein the indication that a storage device does not have up-to-date data is generated when the storage device fails to receive one or more recent write requests.

19. The invention of claim 16 wherein the indication that a storage device does not have up-to-date data is generated when a gap is detected in the sequence numbers of write requests consecutively received by the storage device.

20. A method for use in a redundant data system which comprises a host computer, a plurality of storage devices, and an interconnecting computer network, the method comprising:

executing read and write requests on at least a subset of the plurality of storage devices, such requests being received from the host computer over the computer network, each received write request having an associated sequence number that was consecutively assigned by the host computer and sent with the write request; and recovering data from an indicated other storage device when one storage device is determined not to contain up-to-date data, the indication of the other storage device being received from the host computer, wherein data recovery from the other storage device is directly made without transiting through the host computer.

21. The invention of claim 20 wherein the computer network is an IP network.

22. The invention of claim 20 wherein the one storage device is determined not to contain up-to-date data when it fails to receive one or more recent write requests.

23. The invention of claim 20 wherein the one storage device is determined not to contain up-to-date data when a gap is detected in the sequence numbers of write requests consecutively received by the storage device.

* * * * *